United States Patent
Du (10) Patent No.: US 9,958,743 B2
(45) Date of Patent: May 1, 2018

(54) LIQUID CRYSTAL DISPLAY PANEL (71) Applicant: SHENZHEN CHINA STAR OPTOELECTRONICS TECHNOLOGY CO., LTD., Shenzhen (CN)

(72) Inventor: Peng Du, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 234 days.

(21) Appl. No.: 14/891,744

(22) PCT Filed: Aug. 20, 2015

(86) PCT No.: PCT/CN2015/087588
§ 371 (c)(1),
(2) Date: Nov. 17, 2015

(87) PCT Pub. No.: WO2017/024607
PCT Pub. Date: Feb. 16, 2017

(65) Prior Publication Data
US 2017/0212380 A1    Jul. 27, 2017

(30) Foreign Application Priority Data
Aug. 11, 2015 (CN) .......................... 2015 1 0490646

(51) Int. Cl.
G02F 1/1345   (2006.01)
G02F 1/1362   (2006.01)
G02F 1/1368   (2006.01)
G02F 1/1343   (2006.01)

(52) U.S. Cl.
CPC ........ *G02F 1/13454* (2013.01); *G02F 1/1368* (2013.01); *G02F 1/13624* (2013.01); *G02F 1/134309* (2013.01); *G02F 1/136286* (2013.01); *G02F 2001/134345* (2013.01); *G02F 2201/121* (2013.01); *G02F 2201/40* (2013.01)

(58) Field of Classification Search
CPC .................................................. G02F 1/13454
See application file for complete search history.

(56) References Cited

U.S. PATENT DOCUMENTS

| | | | | |
|---|---|---|---|---|
| 2007/0030233 A1* | 2/2007 | Chai | .................... | G09G 3/3648 345/98 |
| 2007/0182685 A1* | 8/2007 | Park | .................... | G09G 3/3648 345/96 |
| 2009/0046216 A1* | 2/2009 | Chen | .................... | G02F 1/1368 349/48 |
| 2009/0115923 A1* | 5/2009 | Wang | .................. | G02F 1/13624 349/37 |

(Continued)

Primary Examiner — Sang V Nguyen
(74) Attorney, Agent, or Firm — Osha Liang LLP (57) ABSTRACT The present invention provides a liquid crystal display panel, comprising: a control terminal of the first main thin film transistor on the nth row of the pixels connected to a branch of the scanning lines to which the nth row of the pixels correspond; the control terminal of the second main thin film transistor on the nth row of the pixels connected to a first branch of the scanning line of the (n+1)th row; the control terminal of the auxiliary thin film transistor on the (n+1)th row of pixels connected to a branch of the scanning lines of the (n+1)th row.

16 Claims, 9 Drawing Sheets (56) References Cited

U.S. PATENT DOCUMENTS

| | | | |
|---|---|---|---|
| 2011/0057924 A1* | 3/2011 | Yanai | G09G 3/3677 345/212 |
| 2013/0127829 A1* | 5/2013 | Hou | G09G 3/3266 345/419 |
| 2013/0293525 A1* | 11/2013 | Lee | G09G 3/32 345/212 |
| 2015/0116301 A1* | 4/2015 | Irie | G09G 3/003 345/212 |
| 2015/0177579 A1* | 6/2015 | Lim | G02F 1/134336 345/90 |

* cited by examiner

FIG. 12

LIQUID CRYSTAL DISPLAY PANEL

BACKGROUND OF THE INVENTION

1. Field of the Invention

The present invention relates to the technical field of liquid crystal displays, and in particular to a liquid crystal display panel.

2. Description of the Related Art

Figure 1:
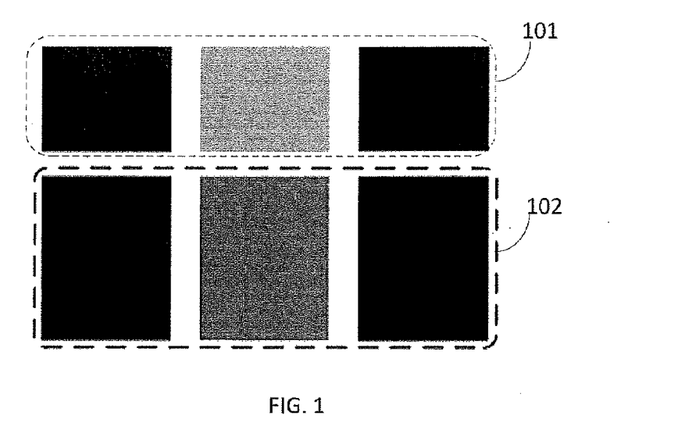
FIG. 1 illustrates a diagram of the arrangement of the liquid crystal display panel according to the prior art.

A traditional Vertical Alignment (referred to as VA) liquid crystal display panel often has a problem of color shift when watched from a wide viewing angle. The pixels are divided into two regions in the prior art, as shown in FIG. 1, including a main pixel region 101 and a sub-pixel region 102, to improve the problem of color shift from a wide viewing angle. When the same grayscale signals are inputted to the panel, the brightness of the main pixel region 101 (Main) is higher, and the brightness of the sub-pixel region (Sub) 102 is lower, in order to improve the problem of color shift from a wide viewing angle of the panel. The main pixel region occupies about 40% of the aperture region, the sub-region occupies about 60% of the aperture region, but because the area of the sub-region is larger, a transmittance of the entire pixel will thus drop significantly, while a power consumption of the backlight is increased.

Therefore, a liquid crystal display panel needs to be provided to solve the problem of the prior art.

SUMMARY OF THE INVENTION

The present invention aims to provide a liquid crystal display panel to solve the technical problem of the lower aperture ratio of the existing liquid crystal display panel.

To solve the technical problems above, the present invention provides a liquid crystal display panel, comprising:

a plurality of data lines for inputting data signals;

a plurality of scanning lines for inputting scanning signals; the scanning lines comprising a first branch and a second branch; the first branch being located on an upper edge of a pixel, the second branch being located on a lower edge of the pixel; and the first branch and the second branch respectively correspond to a position at a junction of the two adjacent pixels;

a plurality of pixels formed and enclosed by the data lines and the scanning lines, the pixels comprising main pixels and sub-pixels, the main pixels and the sub-pixels disposed adjacently;

the main pixels being correspondingly disposed with a first main thin film transistor, a second main thin film transistor, and a first capacitor;

a control terminal of the first main thin film transistor on the nth row of the pixels connected to a branch of the scanning lines to which the nth row of the pixels correspond;

the control terminal of the second main thin film transistor on the nth row of the pixels being connected to the first branch of the scanning line to which the (n+1)th row of the pixels correspond;

the control terminal of auxiliary thin film transistor on the (n+1)th row of pixels being connected to a branch of the scanning line to which the (n+1)th row of the pixels correspond;

an input terminal of the first main thin film transistor connected to the data line, an output terminal of the first main thin film transistor connected to the first capacitor; the output terminal of the first main thin film transistor further connected to the input terminal of the second main thin film transistor;

the input terminal of the auxiliary thin film transistor being connected to the data line, the output terminal of the auxiliary thin film transistor being connected to a second capacitor, wherein n is an integer greater than or equal to 2;

the sub-pixel being correspondingly disposed with a first auxiliary thin film transistor and a second auxiliary thin film transistor; and the input terminal of the first auxiliary thin film transistor being connected to the data line, the output terminal of the first auxiliary thin film transistor being connected to the second capacitor; the output terminal of the first auxiliary thin film transistor being further connected to the input terminal of the second auxiliary thin film transistor; a second control terminal of the auxiliary thin film transistor on the (n+1)th row of pixels connected to a second branch of the scanning line to which the nth row of the pixels correspond.

In the liquid crystal display panel of the present invention, the control terminal of the first main thin film transistor on the nth row of the pixels is connected to the first branch of the scanning line to which the nth row of the pixels correspond; the first the control terminal of auxiliary thin film transistor of the pixel adjacent to the pixel on the nth row is connected to the second branch of the scanning line to which the nth row of the pixels correspond.

The control terminal of the second main thin film transistor on the nth row of the pixels is connected to the first branch of the scanning line to which the (n+1)th row of the pixels correspond; the second the control terminal of auxiliary thin film transistor of the pixel adjacent to the pixel on the nth row is connected to the second branch of the scanning line to which the (n−1)th row of pixels correspond.

The first the control terminal of auxiliary thin film transistor on the (n+1)th row of pixels is connected to the second branch of the scanning line to which the (n+1)th row of pixels correspond; on the (n+1)th row the control terminal of the first main thin film transistor of the pixel adjacent to the pixel is connected to the first branch of the scanning line to which the (n+1)th row of pixels correspond.

In the liquid crystal display panel of the present invention, the control terminal of the first main thin film transistor on the nth row of the pixels is connected to the second branch of the scanning line to which the nth row of the pixels correspond; the first the control terminal of auxiliary thin film transistor of the pixel adjacent to the pixel on the nth row is connected to the first branch of the scanning line to which the nth row of the pixels correspond.

The control terminal of the second main thin film transistor on the nth row of the pixels is connected to the first branch of the scanning line to which the (n+1)th row of the pixels correspond; the second the control terminal of auxiliary thin film transistor of the pixel adjacent to the pixel on the nth row is connected to the second branch of the scanning line to which the (n−1)th row of pixels correspond.

The first the control terminal of auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

In the liquid crystal display panel of the present invention, the main pixel is further disposed with a third capacitor; the sub-pixel is further disposed with a fourth capacitor;

the output terminal of the second main thin film transistor is connected to the third capacitor;

the output terminal of the second auxiliary thin film transistor is connected to the fourth capacitor.

In the liquid crystal display panel of the present invention, the liquid crystal display panel comprises a common electrode, the output terminal of the second main thin film transistor is connected to the common electrode, and the output terminal of the second auxiliary thin film transistor is also connected to the common electrode.

In the liquid crystal display panel of the present invention, when the liquid crystal display panel scans from top to bottom, a display brightness of the main pixel is less than the display brightness of the sub-pixel.

When the liquid crystal display panel scans from bottom to top, the display brightness of the main pixel is greater than or equal to display brightness of the sub-pixel.

To solve the technical problem above, the present invention creates a liquid crystal display panel, comprising:

a plurality of data lines for inputting data signals;

a plurality of scanning lines for inputting scanning signals; the scanning lines comprising a first branch and a second branch; the first branch located on an upper edge of a pixel, the second branch located on a lower edge of the pixel; and the first branch and the second branch respectively correspond to a position at a junction of the two adjacent pixels;

a plurality of pixels formed and enclosed by the data lines and the scanning lines, the pixels comprising main pixels and sub-pixels, the main pixels and the sub-pixels being disposed adjacently;

the main pixels being correspondingly disposed with a first main thin film transistor and a second main thin film transistor, a first capacitor; the sub-pixel being correspondingly disposed with at least an auxiliary thin film transistor, a second capacitor;

a control terminal of the first main thin film transistor on the nth row of the pixels connected to a branch of the scanning lines to which the nth row of the pixels correspond;

the control terminal of the second main thin film transistor on the nth row of the pixels being connected to the first branch of the scanning line to which the (n+1)th row of the pixels correspond;

the control terminal of the auxiliary thin film transistor on the (n+1)th row of pixels being connected to a branch of the scanning line to which the (n+1)th row of the pixels correspond;

an input terminal of the first main thin film transistor connected to the data line, an output terminal of the first main thin film transistor connected to the first capacitor; the output terminal of the first main thin film transistor being further connected to the input terminal of the second main thin film transistor; and the input terminal of the auxiliary thin film transistor being connected to the data line, the output terminal of the auxiliary thin film transistor being connected to the second capacitor, wherein n is and integer greater than or equal to 2.

In the liquid crystal display panel of the present invention, the sub-pixel is correspondingly disposed with a first auxiliary thin film transistor and a second auxiliary thin film transistor.

The input terminal of the first auxiliary thin film transistor is connected to the data line, the output terminal of the first auxiliary thin film transistor is connected to the second capacitor; the output terminal of the first auxiliary thin film transistor is further connected to the input terminal of the second auxiliary thin film transistor; a second control terminal of the auxiliary thin film transistor on the (n+1)th row of pixels is connected to a second branch of the scanning line to which the nth row of the pixels correspond.

In the liquid crystal display panel of the present invention, the control terminal of the first main thin film transistor on the nth row of the pixels is connected to the first branch of the scanning line to which the nth row of the pixels correspond; the first the control terminal of the auxiliary thin film transistor of the pixel adjacent to the pixel on the nth row is connected to the second branch of the scanning line to which the nth row of the pixels correspond.

The control terminal of the second main thin film transistor on the nth row of the pixels is connected to the first branch of the scanning line to which the (n+1)th row of the pixels correspond; the second control terminal of the auxiliary thin film transistor of the pixel adjacent to the pixel on the nth row is connected to the second branch of the scanning line to which the (n−1)th row of pixels correspond.

The first the control terminal of auxiliary thin film transistor on the (n+1)th row of pixels is connected to the second branch of the scanning line to which the (n+1)th row of pixels correspond; the control terminal of the first main thin film transistor of the pixel adjacent to the pixel on the (n+1)th row is connected to the first branch of the scanning line to which the (n+1)th row of pixels correspond.

In the liquid crystal display panel of the present invention, the control terminal of the first main thin film transistor on the nth row of the pixels is connected to the second branch of the scanning line to which the nth row of the pixels correspond; the first the control terminal of the auxiliary thin film transistor of the pixel adjacent to the pixel on the nth row is connected to the first branch of the scanning line to which the nth row of the pixels correspond.

The control terminal of the second main thin film transistor on the nth row of the pixels is connected to the first branch of the scanning line to which the (n+1)th row of the pixels correspond; the second the control terminal of the auxiliary thin film transistor of the pixel adjacent to the pixel on the nth row is connected to the second branch of the scanning line to which the (n−1)th row of pixels correspond.

The first the control terminal of auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

In the liquid crystal display panel of the present invention, the liquid crystal display panel comprises a common electrode, the main pixel is further disposed with a third capacitor; the sub-pixel is further disposed with a fourth capacitor.

The output terminal of the second main thin film transistor is connected to the third capacitor.

The output terminal of the second auxiliary thin film transistor is connected to the fourth capacitor.

In the liquid crystal display panel of the present invention, the liquid crystal display panel comprises a common electrode, the output terminal of the second main thin film transistor is connected to the common electrode, and the output terminal of the second auxiliary thin film transistor is also connected to the common electrode.

In the liquid crystal display panel of the present invention, the sub-pixel is correspondingly disposed with only one auxiliary thin film transistor.

The control terminal of the first main thin film transistor on the nth row of the pixels is connected to the second branch of the scanning line to which the nth row of the pixels correspond; the control terminal of the auxiliary thin film transistor of the pixel adjacent to the pixel on the nth row is connected to the first branch of the scanning line to which the nth row of the pixels correspond.

The control terminal of auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

In the liquid crystal display panel of the present invention, the liquid crystal display panel comprises a common electrode, and the main pixel is further disposed with a third capacitor;

the output terminal of the second main thin film transistor is connected to the third capacitor or the common electrode.

In the liquid crystal display panel of the present invention, the first branch and the second branch respectively correspond to a position at a junction of the two adjacent pixels.

In the liquid crystal display panel of the present invention, when the liquid crystal display panel scans from top to bottom, a display brightness of the main pixel is less than the display brightness of the sub-pixel.

When the liquid crystal display panel scans from bottom to top, the display brightness of the main pixel is greater than or equal to the display brightness of the sub-pixel.

The liquid crystal display panel of the present invention improves the aperture ratio of the panel and display effect through the re-layout of the driving circuit on the existing panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

As used in this specification the term "embodiment" means an instance, an example, or an illustration. In addition, for the articles in this specification and the appended claims, "a" or "an" in general can be interpreted as "one or more" unless specified otherwise or clear from context to determine the singular form.

Figure 2:
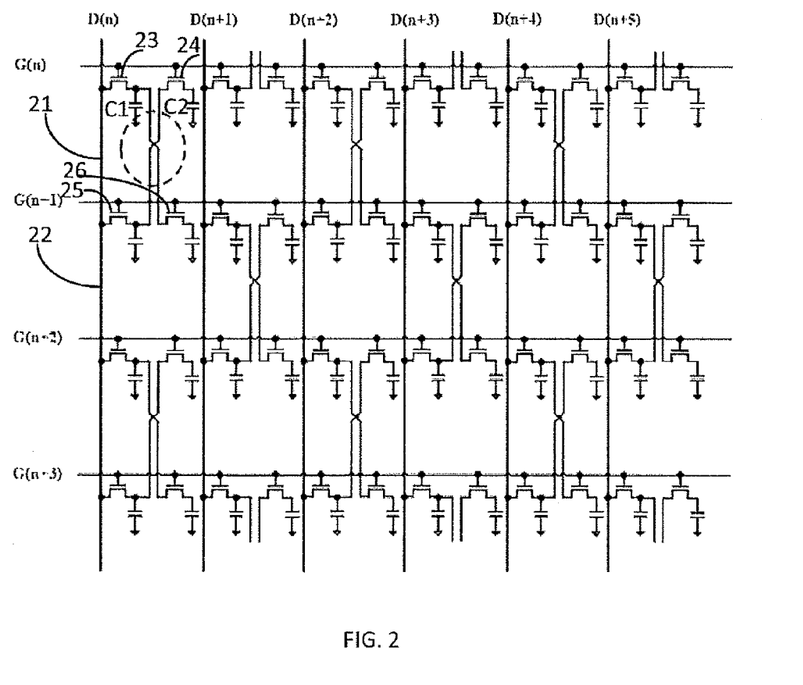
FIG. 2 illustrates a diagram of the first structure of the liquid crystal display panel according to the prior art.

Please refer to FIG. 2. FIG. 2 illustrates a diagram of the first structure of the liquid crystal display panel according to the prior art.

As shown in FIG. 2, the liquid crystal display panel of the prior art includes: the data lines D(n) to D(n+5), the scanning lines G(n) to G(n+3), each pixel is disposed with two thin film transistors, including a first thin film transistor and a second thin film transistor, one end of the output terminal of the first thin film transistor is connected to the pixel electrode, the other end is connected to the first capacitor C1; the other end of the first capacitor C1 is connected to the common electrode; wherein the input terminal of a pixel of the second thin film transistor is connected to the output terminal of the first thin film transistor of the pixel adjacent to the pixel on the same row, the output terminal of the second thin film transistor is connected to the second capacitor C2; the other end of the second capacitor C2 is connected to the common electrode; as to the pixel 21 of the first column and the first row, the pixel 21 includes the first thin film transistor 23 and the second thin film transistor 24; as to the pixel 22 of the second column and the first row, the pixel 22 includes the first thin film transistor 25 and the second thin film transistor 26; the dashed box represents the cross line, that is, the output terminal of the first thin film transistor 23 of the pixel 21 is not connected to the input terminal of the second thin film transistor 24, but rather is connected; to the input terminal of the second thin film transistor 26 of the pixel 22, similarly, the output terminal of the first thin film transistor 25 of the pixel 22 is not connected to the input terminal of the second thin film transistor 26, but rather is connected to the input terminal of the second thin film transistor 24 of the pixel 21.

Figure 3:
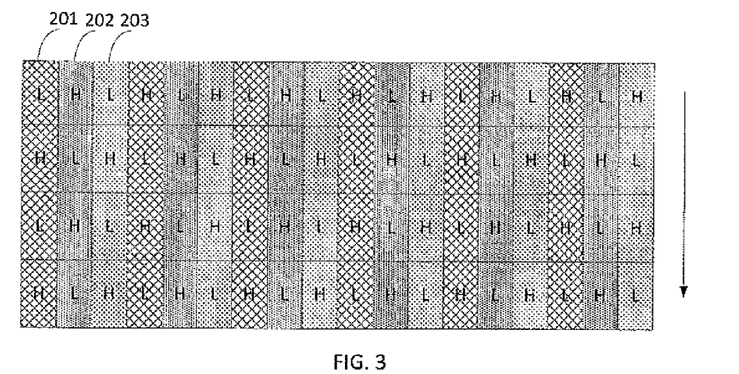
FIG. 3 illustrates a diagram of the first display effect in FIG. 2.

When scanning from top to bottom, the scanning line G(n) of the nth column is turned on first, the first thin film transistor 23 of the pixel 21 is thus closed, and the pixel 21 is charged, meanwhile the second thin film transistor 24 is also closed. When the scanning line G(n+1) of the (n+1)th column is turned on, the first thin film transistor 25 of the pixel 22 is thus closed, and the pixel 22 is charged; meanwhile the second thin film transistor 26 is also closed, because the input terminal of the second thin film transistor 26 of the pixel 22 is connected to the output terminal of the first thin film transistor 23 of the pixel 21, so the voltage of the pixel electrode of the pixel 21 is shared to the second capacitor C2 of the pixel 22, and the brightness of the pixel 21 is lowered. Meanwhile, because the scanning line of the nth column is already closed, so the second thin film transistor 24 of the pixel 21 is disconnected, after the pixel electrode of the pixel 22 is charged, will not be pulled down by the second capacitor C2 of the pixel 21, thus the brightness of the pixel 22 remains high. The display effect of the display panel is as shown in FIG. 3; the arrow direction in FIG. 3 represents the scanning direction. 201 in FIG. 3 represents a red pixel, 202 represents a green pixel, 203 represents a green pixel, and H, L represent the high and low brightness, respectively.

Figure 4:
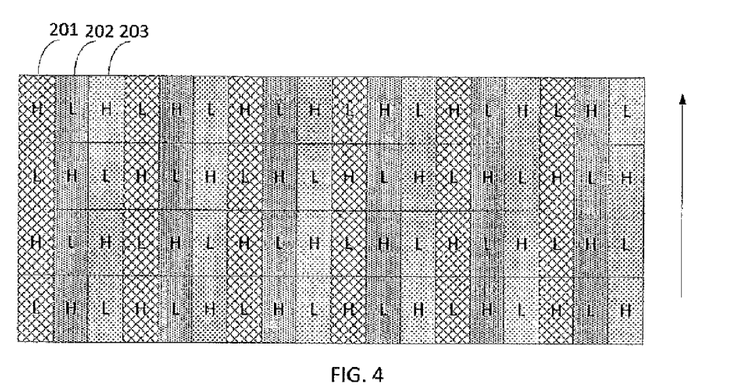
FIG. 4 illustrates a diagram of the second display effect in FIG. 2.

When scanning from bottom to top, the scanning line G(n+1) of the (n+1)th column is turned on first, the first thin film transistor 25 of the pixel 22 is thus closed, and the pixel 22 is charged. Meanwhile the second thin film transistor 26 is also closed. When the scanning line G(n) of the nth column is turned on, the first thin film transistor 23 of the pixel 21 is thus closed, and the pixel 21 is charged. Meanwhile the second thin film transistor 24 is also closed, and because the input terminal of the second thin film transistor 24 of the pixel 21 is connected to the output terminal of the first thin film transistor 25 of the pixel 22, so the voltage of the pixel electrode of the pixel 21 is shared to the second capacitor C2 of the pixel 22, and the brightness of the pixel 22 is lowered; meanwhile, because the scanning line of the (n+1)th column is already closed, so the second thin film transistor 26 of the pixel 22 is disconnected, after the pixel electrode of the pixel 21 is charged, will not be pulled down by the second capacitor C2 of the pixel 22, thus the brightness of the pixel 21 remains high. The display effect of the display panel is as shown in FIG. 4, the arrow direction in FIG. 4 represents the scanning direction. 201 in FIG. 4 represents a red pixel, 202 represents a green pixel, 203 represents a green pixel, and H, L represent the high and low brightness, respectively.

Figure 5:
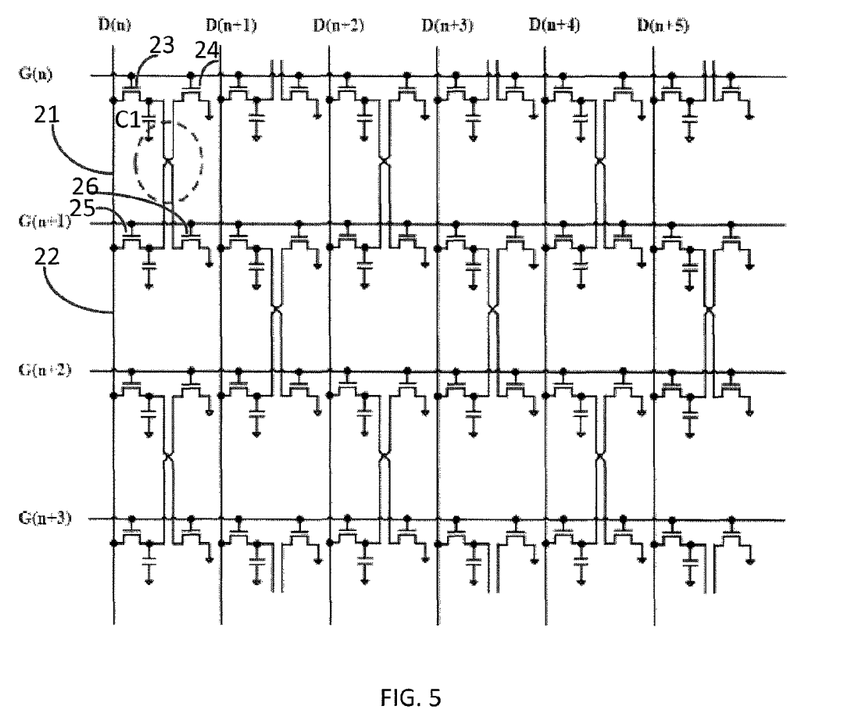
FIG. 5 illustrates a diagram of the second structure of the liquid crystal display panel according to the prior art.

Please refer to FIG. 5. FIG. 5 illustrates a diagram of the second structure of the liquid crystal display panel according to the prior art.

The difference between the display panel in FIG. 5 and FIG. 2 is: the output terminal of the second thin film transistor of each pixel is no longer connected to the second capacitor, but is rather directly connected to the common electrode, and pulling down the voltage level of the pixel electrode through dividing the voltage by resistors.

In the two display panels above, as shown by the dashed line box in FIG. 2 and FIG. 5, each input terminal of a pixel of the second thin film transistor is connected to the output terminal of the first thin film transistor of the pixel adjacent to the pixel on the same row through the cross line. Because the connection through cross line requires aperture, there is more space needed, and the aperture ratio of the pixel is affected; additionally the inside of the pixel may thus be obscured.

Figure 6:
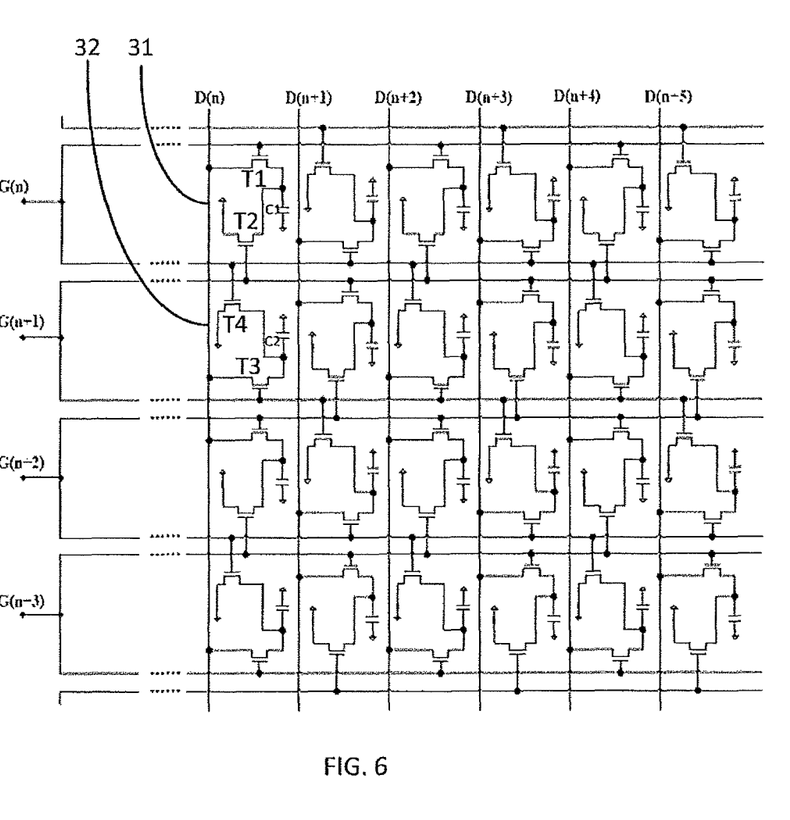
FIG. 6 illustrates a diagram of the first structure of the liquid crystal display panel according to the first embodiment of the present invention.
Figure 7:
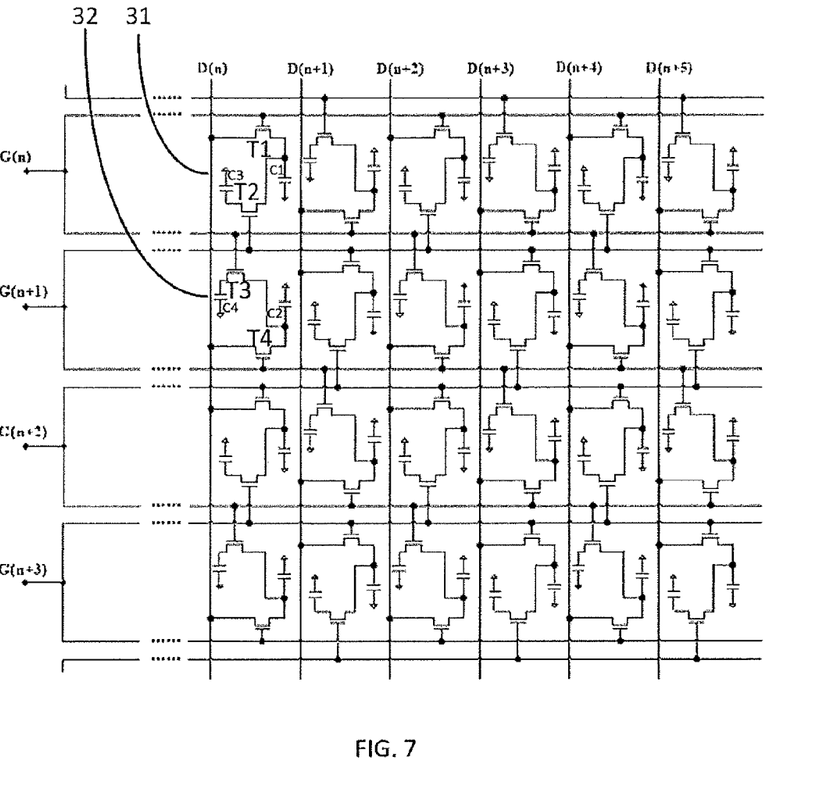
FIG. 7 illustrates a diagram of the second structure of the liquid crystal display panel according to the first embodiment of the present invention.

Please refer to FIG. 6-FIG. 7. FIG. 6-FIG. 7 illustrate diagrams of the structures of the liquid crystal display panel according to the first embodiment of the present invention.

As shown in FIG. 6, the first liquid crystal display panel of the present invention includes: the data lines D(n) to D(n+5) and the scanning lines G(n) to G(n+3), the data line is used for inputting data signals; wherein n is an integer greater than or equal to 2; the scanning line is used for inputting scanning signals; the scanning line includes a first branch and a second branch; the first branch is on the upper edge of the pixel, the second branch is on the lower edge of the pixels; the pixels are formed and enclosed by the data lines and the scanning lines, the pixels include the main pixels 31 and the sub-pixels 32, the main pixels 31 and the sub-pixels 32 are disposed adjacently; the main pixels 31 are disposed with a first main thin film transistor T1 and a second main thin film transistor T2, a first capacitor C1; the sub-pixels 32 are correspondingly disposed with first auxiliary thin film transistor T3, the second auxiliary thin film transistor T4, the second capacitor C2; the control terminal of the first main thin film transistor on the nth row of the pixels connected to the first branch of the scanning lines G(n) to which the nth row of the pixels correspond; the first the control terminal of auxiliary thin film transistor of the pixel adjacent to the pixel on the nth row is connected to the second branch of the scanning line G(n) to which the nth row of the pixels correspond; the control terminal of the second main thin film transistor on the nth row of the pixels connected to the first branch of the scanning line G(n+1) to which the (n+1)th row of the pixels correspond; the second control terminal of the auxiliary thin film transistor of the pixel adjacent to the pixel on the nth row is connected to the second branch of the scanning line to which the (n−1)th row of pixels correspond; the first the control terminal of auxiliary thin film transistor on the (n+1)th row of pixels is connected to the second branch of the scanning line G(n+1) to which the (n+1)th row of pixels correspond; the control terminal of the first main thin film transistor of the pixel adjacent to the pixel on the (n+1)th row is connected to the first branch of the scanning line G(n+1) to which the (n+1)th row of pixels correspond.

The input terminal of the first main thin film transistor T1 is connected to the data line, the output terminal of the first main thin film transistor T1 is connected to the first capacitor C1; the output terminal of the first main thin film transistor T1 is further connected to the input terminal of the second main thin film transistor T2; the input terminal of the first auxiliary thin film transistor T3 is connected to the data line, the output terminal of the first auxiliary thin film transistor T3 is connected to the second capacitor C2; the output terminal of the first auxiliary thin film transistor T3 is further connected to the input terminal of the second auxiliary thin film transistor T4; the control terminal of the second auxiliary thin film transistor T4 on the (n+1)th row of pixels is connected to the second branch of the scanning line G(n) to which the nth row of pixels correspond.

The liquid crystal display panel includes a common electrode, the output terminal of the second main thin film transistor T2 is connected to the common electrode, and the output terminal of the second auxiliary thin film transistor T4 is also connected to the common electrode.

When scanning from top to bottom, the scanning line G(n) of the nth column is turned on first, the first thin film transistor T1 of the main pixel 31 is thus closed, and the main pixel 31 is charged. Meanwhile, the second auxiliary thin film transistor T4 is also closed. When the scanning line G(n+1) of the (n+1)th column is turned on, the first auxiliary thin film transistor T3 of the sub-pixel 32 is thus closed, and the sub-pixel 32 is charged. Meanwhile, the second main thin film transistor T2 is also closed, and because the input terminal of the second main thin film transistor T2 of the main pixel 31 is connected to the output terminal of the first main thin film transistor T1 of the main pixel 31, so the voltage of the pixel electrode of the main pixel 31 is shared to the common electrode through the second main thin film transistor T2, and the brightness of the main pixel 31 is lowered; meanwhile, because the scanning line of the nth column is already closed, so the second auxiliary thin film transistor T4 of the sub-pixel 32 is disconnected, after the pixel electrode of the sub-pixel 32 is charged, will not be pulled down by the second auxiliary thin film transistor T4, thus the brightness of the sub-pixel 32 remains high, that is, the brightness of the main pixel 31 is less than the brightness of the sub-pixel 32. The display effect of the display panel is as shown in FIG. 3; the arrow direction in FIG. 3 represents the scanning direction.

When scanning from bottom to top, the scanning line G(n+1) of the (n+1)th column is turned on first, the first auxiliary thin film transistor T3 of the sub-pixel 32 is thus closed, and the sub-pixel 32 is charged. Meanwhile the second main thin film transistor T2 is also closed. When the scanning line G(n) of the nth column is turned on, the first main thin film transistor T1 of the main pixel 31 is thus closed, and the main pixel 31 is charged. Meanwhile, the second auxiliary thin film transistor T4 is also closed, and because the input terminal of the second auxiliary thin film transistor T4 of the sub-pixel 32 is connected to the output terminal of the first auxiliary thin film transistor T3 of the sub-pixel 32, so the voltage of the pixel electrode of the sub-pixel 32 is thus shared to the common electrode through the second auxiliary thin film transistor T4, and the brightness of the sub-pixel 32 is lowered; meanwhile, because the scanning line of the (n+1)th column is already closed, so the second main thin film transistor T2 of the main pixel 31 is disconnected, after the pixel electrode of the main pixel 31 is charged, will not be pulled down by the second main thin film transistor T2, thus the brightness of the main pixel 31 remains high, that is, the brightness of the main pixel is greater than the brightness of the sub-pixel. The display effect of the display panel is as shown in FIG. 4; the arrow direction in FIG. 4 represents the scanning direction.

FIG. 7 illustrates a diagram of the second structure of the liquid crystal display panel according to the first embodiment of the present invention. The difference between FIG. 7 and FIG. 6 is: the main pixels are further disposed with a third capacitor C3; the sub-pixels are further disposed with a fourth capacitor C4; when scanning from top to bottom, the voltage of the pixel electrode of the main pixel 31 is shared to the third capacitor C3, and the brightness of the main pixel 31 is thus lowered; when scanning from bottom to top, the voltage of the pixel electrode of the sub-pixel 32 is shared to the fourth capacitor C4, and the brightness of the sub-pixel 32 is thus lowered.

Because each scanning line is divided into two branches in the present invention, the control terminal of the thin film transistor for sharing charges is connected to the branch nearest to the control terminal from the upper column or lower column of the branches of the scanning line nearest to the control terminal, thus crossover in the aperture region is avoided, the aperture ratio is increased, the obscurities is avoided, and the display effect is improved.

Figure 8:
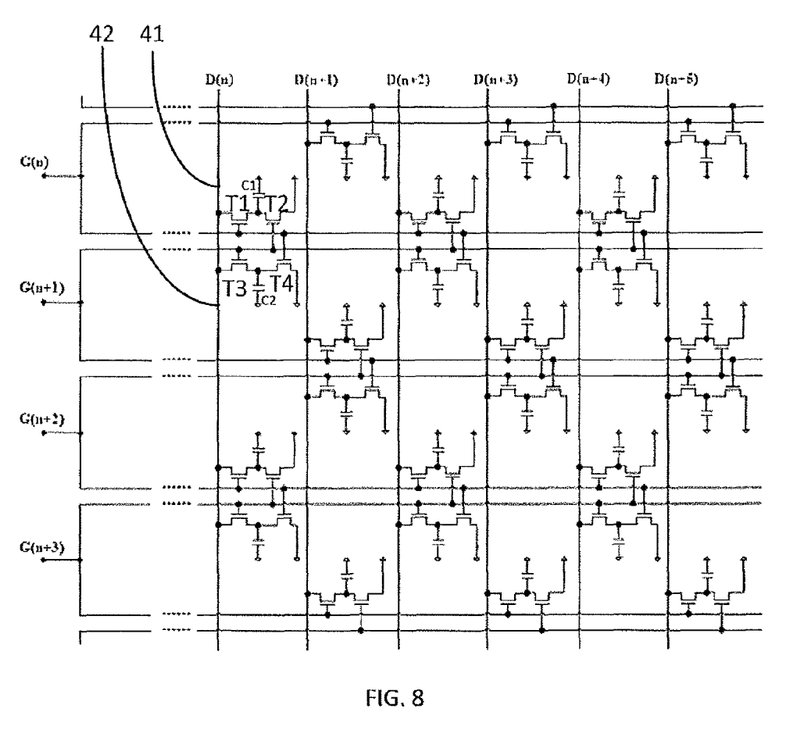
FIG. 8 illustrates a diagram of the first structure of the liquid crystal display panel according to the second embodiment of the present invention.
Figure 9:
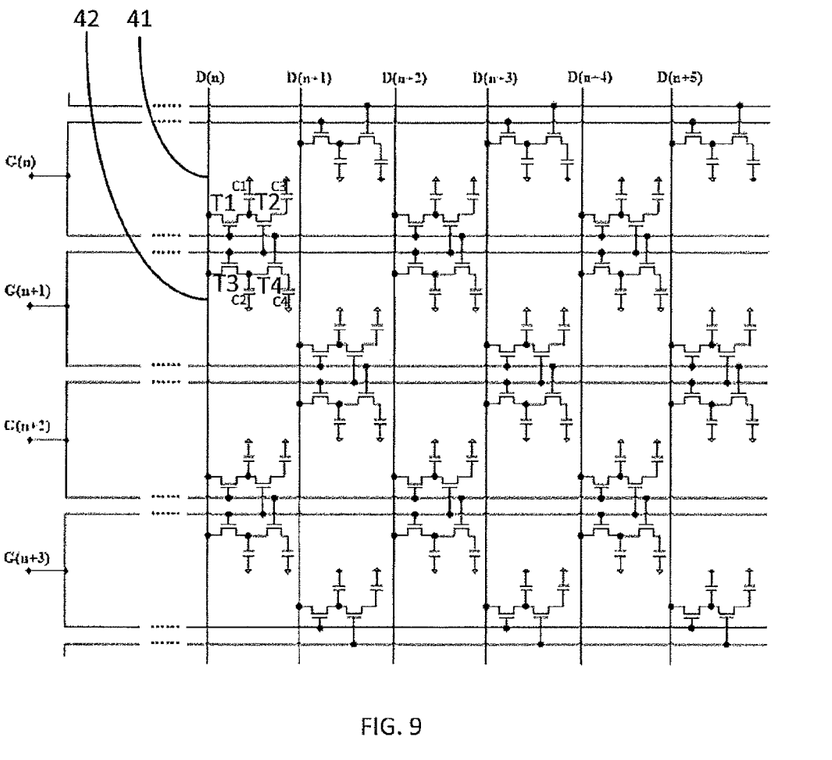
FIG. 9 illustrates a diagram of the second structure of the liquid crystal display panel according to the second embodiment of the present invention.

Please refer to FIG. 8-FIG. 9. FIG. 8-FIG. 9 illustrate diagrams of the structures of the liquid crystal display panel according to the second embodiment of the present invention.

As shown in FIG. 8, the liquid crystal display panel of the present invention includes: the data lines D(n) to D(n+5) and the scanning lines G(n) to G(n+3), the data lines are used for inputting the data signals; the scanning lines are used for inputting scanning signals; the scanning lines includes a first branch and a second branch; the first branch is located on an upper edge of a pixel, the second branch is located on a lower edge of the pixel; the pixels are formed and enclosed by the data lines and the scanning lines, the pixels include main pixels 41 and sub-pixels 42, the main pixels 41 and the sub-pixels 42 are disposed adjacently; the main pixels 41 are correspondingly disposed with a first main thin film transistor T1 and a second main thin film transistor T2, a first capacitor C1; the sub-pixels 42 are correspondingly disposed with the first auxiliary thin film transistor T3, the second auxiliary thin film transistor T4, and a second capacitor C2; a control terminal of the first main thin film transistor T1 on the nth row of the pixels is connected to a branch of the scanning lines G(n) to which the nth row of the pixels correspond; the control terminal of the first auxiliary thin film transistor T1 of the pixel adjacent to the pixel on the nth row is connected to the first branch of the scanning line G(n) to which the nth row of the pixels correspond; the control terminal of the second main thin film transistor on the nth row of the pixels is connected to the first branch of the scanning line G(n+1) to which the (n+1)th row of pixels correspond; the second the control terminal of the auxiliary thin film transistor of the pixel adjacent to the pixel on the nth row is connected to the second branch of the scanning line to which the (n−1)th row of pixels correspond; the first the control terminal of auxiliary thin film transistor on the (n+1)th row of pixels is connected to the first branch of the scanning line G(n+1) to which the (n+1)th row of pixels correspond; the control terminal of the first main thin film transistor of the pixel adjacent to the pixel on the (n+1)th row is connected to the second branch of the scanning line to which the (n+1)th row of pixels correspond.

The input terminal of the first main thin film transistor T1 is connected to the data line, the output terminal of the first main thin film transistor T1 is connected to the first capacitor C1; the output terminal of the first main thin film transistor T1 is further connected to the input terminal of the second main thin film transistor T2; the input terminal of the first auxiliary thin film transistor T3 is connected to the data line, the output terminal of the first auxiliary thin film transistor T3 is connected to one end of the second capacitor C2, the other end of the second capacitor C2 is connected to the common electrode; the output terminal of the first auxiliary thin film transistor T1 is further connected to the input terminal of the second auxiliary thin film transistor T2; the control terminal of the second auxiliary thin film transistor T2 on the (n+1)th row of pixels is connected to the second branch of the scanning line G(n) to which the nth row of the pixels correspond.

The liquid crystal display panel includes a common electrode, the output terminal of the second main thin film transistor T2 is connected to the common electrode, the output terminal of the second auxiliary thin film transistor T4 is also connected to the common electrode.

When scanning from top to bottom, the scanning line G(n) of the nth column is turned on first, the first main thin film transistor T1 of the main pixel 41 is thus closed, and the main pixel 41 is charged. Meanwhile the second auxiliary thin film transistor T4 is also closed. When the scanning line G(n+1) of the (n+1)th column is turned on, the first auxiliary thin film transistor T3 of the sub-pixel 42 is thus closed, and the sub-pixel 42 is charged. Meanwhile, the second main thin film transistor T2 is also closed, and because the input terminal of the second main thin film transistor T2 of the main pixel 41 is connected to the output terminal of the first main thin film transistor T1 of the main pixel 41, so the voltage of the pixel electrode of the main pixel 41 is shared to the common electrode through the second main thin film transistor T2, and the brightness of the main pixel 41 is lowered; meanwhile, because the scanning line of the nth column is already closed, the second auxiliary thin film transistor T4 of the sub-pixel 42 is thus disconnected, after the pixel electrode of the sub-pixel 42 is charged, will not be pulled down by the second auxiliary thin film transistor T4, thus the brightness of the sub-pixel 42 remains high, that is, the brightness of the main pixel 41 is less than the brightness of the sub-pixel 42. The display effect of the display panel is as shown in FIG. 3; the arrow direction in FIG. 3 represents the scanning direction.

When scanning from bottom to top, the scanning line G(n+1) of the (n+1)th column is turned on first, the first auxiliary thin film transistor T3 of the sub-pixel 42 is thus closed, and the sub-pixel 42 is charged. Meanwhile, the second main thin film transistor T2 is also closed. When the scanning line G(n) of the nth column is turned on, the first main thin film transistor T1 of the main pixel 41 is thus closed, and the main pixel 41 is charged. Meanwhile, the second auxiliary thin film transistor T4 is also closed, and because the input terminal of the second auxiliary thin film transistor T4 of the sub-pixel 42 is connected to the output terminal of the first auxiliary thin film transistor T3 of the sub-pixel 42, so the voltage of the pixel electrode of the sub-pixel 42 is shared to the common electrode through the second auxiliary thin film transistor T4, and the brightness of the sub-pixel 42 is lowered; meanwhile, because the scanning line of the (n+1)th column is already closed, so the second main thin film transistor T2 of the main pixel 41 is disconnected, after the pixel electrode of the main pixel 41 is charged, will not be pulled down by the second main thin film transistor T2, thus the brightness of the main pixel 41 remains high, that is, the brightness of the main pixel is greater than the brightness of the sub-pixel. The display effect of the display panel is as shown in FIG. 4; the arrow direction in FIG. 4 represents the scanning direction.

FIG. 9 illustrates a diagram of the second structure of the liquid crystal display panel according to the first embodiment of the present invention. The difference between FIG. 9 and FIG. 8 is: the main pixels 41 are further disposed with a third capacitor C3; the sub-pixels 42 are further disposed with a fourth capacitor C4; when scanning from top to bottom, the voltage of the pixel electrode of the main pixel 41 is shared to the third capacitor C3, and the brightness of the main pixel 41 is thus lowered; when scanning from bottom to top, the voltage of the pixel electrode of the sub-pixel 42 is shared to the fourth capacitor C4, and the brightness of the sub-pixel 42 is thus lowered.

Because the two TFTs of the main pixels and the two TFTs of the sub-pixels are on the same side of the pixels in the second embodiment, the aperture ratio is increased more than in the first embodiment.

Preferably, the wiring structure makes the positions of the first branch and the second branch correspond to the junction positions of the two adjacent pixels, because the black matrix is disposed in the junction of the two adjacent pixels, the junction is masked by the black matrix. Thus, though the number of the lines is increased, but the aperture ratio of the pixel is not affected at all, and the display effect is better increased.

Figure 10:
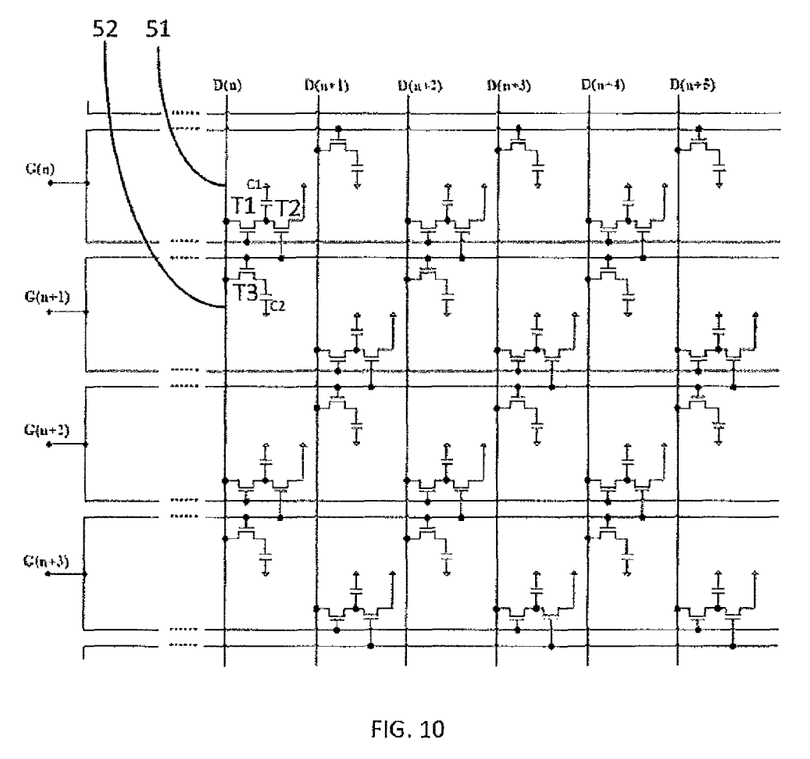
FIG. 10 illustrates a diagram of the first structure of the liquid crystal display panel according to the third embodiment of the present invention.
Figure 11:
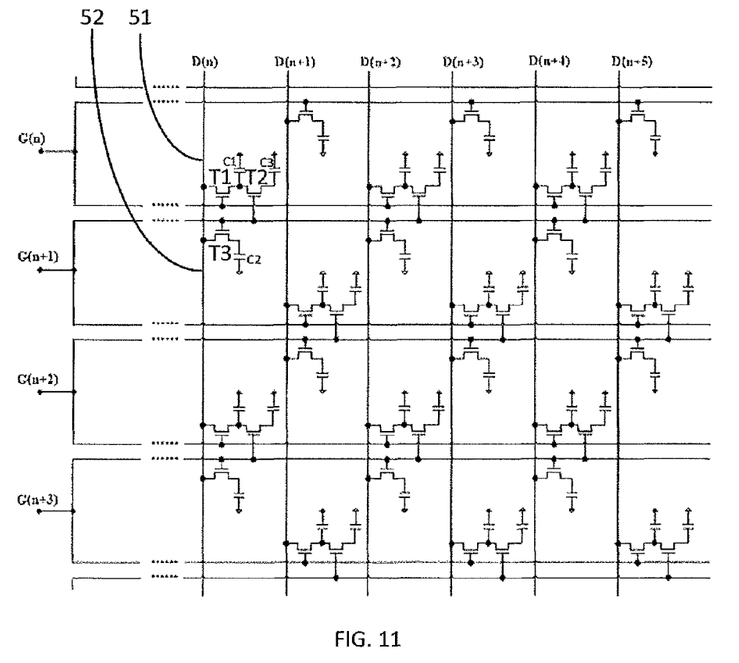
FIG. 11 illustrates a diagram of the second structure of the liquid crystal display panel according to the third embodiment of the present invention.

Please refer to FIG. 10-FIG. 11. FIG. 10-FIG. 11 illustrate diagrams of the structures of the liquid crystal display panel according to the third embodiment of the present invention.

As shown in FIG. 10, the liquid crystal display panel of the present invention includes: the data lines D(n) to D(n+5) and the scanning lines G(n) to G(n+3), the data lines are used for inputting the data signals; the scanning lines are used for inputting scanning signals; the scanning lines includes a first branch and a second branch; the first branch is located on an upper edge of a pixel, the second branch is located on a lower edge of the pixel; the pixels are formed and enclosed by the data lines and the scanning lines, the pixels include main pixels 51 and sub-pixels 52, and the main pixels 51 and the sub-pixels 52 are disposed adjacently; the main pixels 51 are correspondingly disposed with a first main thin film transistor T1 and a second main thin film transistor T2, a first capacitor C1; the sub-pixels 52 are correspondingly disposed with the auxiliary thin film transistor T3 and a second capacitor C2; a control terminal of the first main thin film transistor T1 on the nth row of the pixels is connected to the second branch of the scanning lines G(n) to which the nth row of the pixels correspond; the control terminal of the auxiliary thin film transistor T3 of the pixel adjacent to the pixel on the nth row is connected to the first branch of the scanning line G(n) to which the nth row of the pixels correspond; the control terminal of the second main thin film transistor on the nth row of the pixels is connected to the first branch of the scanning line G(n+1) to which the (n+1)th row of pixels correspond; the control terminal of the auxiliary thin film transistor of the pixel adjacent to the pixel on the (n+1)th row is connected to the first branch of the scanning line G(n+1) to which the (n+1)th row of pixels correspond; the control terminal of the first main thin film transistor of the pixel adjacent to the pixel on the (n+1)th row is connected to the second branch of the scanning line G(n+1) to which the (n+1)th row of pixels correspond.

The input terminal of the first main thin film transistor is connected to the data line, the output terminal of the first main thin film transistor is connected to the first capacitor C1; the output terminal of the first main thin film transistor is further connected to the input terminal of the second main thin film transistor; the input terminal of the auxiliary thin film transistor is connected to the data line, the output terminal of the auxiliary thin film transistor is connected to one end of the second capacitor C2, and the other end of the second capacitor C2 is connected to the common electrode. The liquid crystal display panel includes a common electrode, and the output terminal of the second main thin film transistor T2 is connected to the common electrode.

When scanning from top to bottom, the scanning line G(n) of the nth column is turned on first, the first main thin film transistor T1 of the main pixel 51 is thus closed, and the main pixel 51 is charged. When the scanning line G(n+1) of the (n+1)th column is turned on, the auxiliary thin film transistor T3 of the sub-pixel 52 is closed, and the sub-pixel 52 is charged. Meanwhile, the second main thin film transistor T2 is also closed, and because the input terminal of the second main thin film transistor T2 of the main pixel 51 is connected to the output terminal of the first main thin film transistor T1 of the main pixel 51, so the voltage of the pixel electrode of the main pixel 51 is shared to the common electrode through the second main thin film transistor T2, and the brightness of the main pixel 51 is lowered; meanwhile, because the output terminal of the auxiliary thin film transistor is not connected to the sub-thin film transistor for sharing voltage, after the pixel electrode of the sub-pixel 52 is charged, the pixel electrode of the sub-pixel 52 will not be pulled down, thus the brightness of the sub-pixel 52 remains high, that is, the brightness of the main pixel 51 is less than the brightness of the sub-pixel 52. The display effect of the display panel is as shown in FIG. 3; the arrow direction in FIG. 3 represents the scanning direction.

Figure 12:
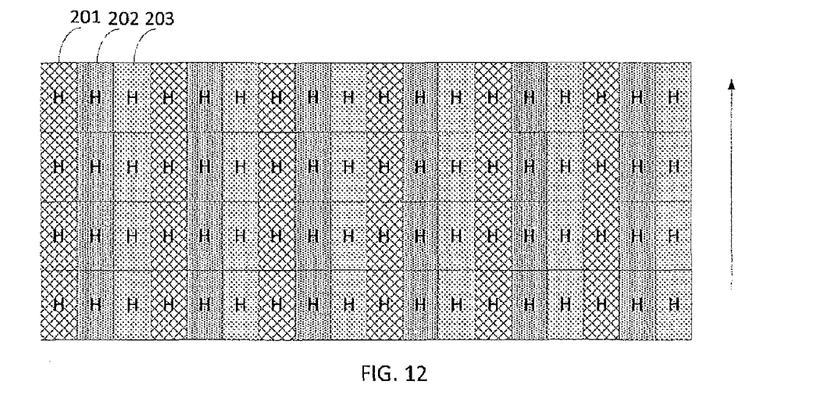
FIG. 12 illustrates a diagram of the display effect according to the third embodiment of the present invention.

When scanning from bottom to top, the scanning line G(n+1) of the (n+1)th column is turned on first, the auxiliary thin film transistor T3 of the sub-pixel 52 is thus closed, and the sub-pixel 52 is charged. Meanwhile, the second main thin film transistor T2 is also closed. When the scanning line G(n) of the nth column is turned on, the first main thin film transistor T1 of the main pixel 51 is thus closed, and the main pixel 51 is charged. Meanwhile, because the scanning line of the (n+1)th column is already closed, so the second main thin film transistor T2 of the main pixel 51 is disconnected, after the pixel electrode of the main pixel 51 is charged, will not be pulled down by the second main thin film transistor T2, thus the brightness of the main pixel 51 remains high, that is, the brightness of the main pixel is equal to the brightness of the sub-pixel. The display effect of the display panel is as shown in FIG. 12; the arrow direction in FIG. 12 represents the scanning direction.

FIG. 11 illustrates a diagram of the second structure of the liquid crystal display panel according to the first embodiment of the present invention; the difference between FIG. 11 and FIG. 10 is: the main pixels 41 are further disposed with a third capacitor C3.

When scanning from top to bottom, the voltage of the pixel electrode of the main pixel 51 is shared to the third capacitor C3, and the brightness of the main pixel 51 is thus lowered.

Because the two TFTs of the main pixels and the two TFTs of the sub-pixels are on the same side of the pixels in the second embodiment, the aperture ratio is increased more than in the first embodiment.

Preferably, the positions of the first branch and the second branch correspond to the junction positions of the two adjacent pixels, and because the black matrix is disposed in the junction of the two adjacent pixels, the junction is masked by the black matrix. Thus, though the number of the lines is increased, the aperture ratio of the pixel is not affected; the technical scheme is adapted to other embodiments too.

Because each scanning line is divided into two branches in the present invention, the control terminal of the thin film transistor for sharing charges is connected to the branch nearest to the control terminal from the upper column or lower column of the branches of the scanning line nearest to the control terminal. Thus crossover in the aperture region is avoided, the aperture ratio is increased, the obscure is avoided, and the display effect is improved.

The liquid crystal display panel of the present invention improves the aperture ratio of the panel and display effect through the re-layout of the driving circuit on the existing panel.

In summary, although the present invention has been described in preferred embodiments above, the preferred embodiments described above are not intended to limit the invention. Persons skilled in the art, without departing from the spirit and scope of the invention otherwise, may be used for a variety modifications and variations, so the scope of the invention defined by the claims prevails.

What is claimed is:

1. A liquid crystal display panel, comprising:
a plurality of data lines for inputting data signals;
a plurality of scanning lines for inputting scanning signals; each of the scanning lines comprising a first branch and a second branch; the first branch located on an upper edge of a pixel, the second branch located on a lower edge of the pixel; and the first branch and the second branch respectively correspond to a position at a junction of the two adjacent pixels;
a plurality of pixels formed and enclosed by the data lines and the scanning lines, the pixels comprising main pixels and sub-pixels, the main pixels and the sub-pixels being disposed adjacently;
the main pixels being correspondingly disposed with a first main thin film transistor, a second main thin film transistor, and a first capacitor;
a control terminal of the first main thin film transistor on the nth row of the pixels connected to a branch of the scanning lines to which the nth row of the pixels correspond;
a control terminal of the second main thin film transistor on the nth row of the pixels being connected to the first branch of the scanning line to which the (n+1)th row of the pixels correspond;
a control terminal of an auxiliary thin film transistor on the (n+1)th row of pixels being connected to a branch of the scanning line to which the (n+1)th row of the pixels correspond;
an input terminal of the first main thin film transistor connected to the data line, an output terminal of the first main thin film transistor connected to the first capacitor;
the output terminal of the first main thin film transistor being further connected to an input terminal of the second main thin film transistor; wherein n is an integer greater than or equal to 2;
the sub-pixel being correspondingly disposed with a first auxiliary thin film transistor and a second auxiliary thin film transistor; and
an input terminal of the first auxiliary thin film transistor being connected to the data line an output terminal of the first auxiliary thin film transistor being connected to a second capacitor; the output terminal of the first auxiliary thin film transistor being further connected to an input terminal of the second auxiliary thin film transistor; a control terminal of the second auxiliary thin film transistor on the (n+1)th row of pixels connected to a second branch of the scanning line to which the nth row of the pixels correspond.

2. A liquid crystal display panel, comprising:
a plurality of data lines for inputting data signals;
a plurality of scanning lines for inputting scanning signals; each of the scanning lines comprising a first branch and a second branch; the first branch being located on an upper edge of a pixel, the second branch being located on a lower edge of the pixel;
a plurality of pixels formed and enclosed by the data lines and the scanning lines, the pixels comprising main pixels and sub-pixels, the main pixels and the sub-pixels being disposed adjacently;
the main pixels being correspondingly disposed with a first main thin film transistor, a second main thin film transistor, and a first capacitor; the sub-pixels being correspondingly disposed with at least an auxiliary thin film transistor, and a second capacitor;
a control terminal of the first main thin film transistor on the nth row of the pixels connected to a branch of the scanning lines to which the nth row of the pixels correspond;
a control terminal of the second main thin film transistor on the nth row of the pixels being connected to the first branch of the scanning line to which the (n+1)th row of the pixels correspond;
a control terminal of a auxiliary thin film transistor on the (n+1)th row of pixels being connected to a branch of the scanning line to which the (n+1)th row of the pixels correspond;
an input terminal of the first main thin film transistor connected to the data line, an output terminal of the first main thin film transistor connected to the first capacitor;
the output terminal of the first main thin film transistor being further connected to an input terminal of the second main thin film transistor; and
an input terminal of the auxiliary thin film transistor being connected to the data line, an output terminal of the auxiliary thin film transistor being connected to the second capacitor, wherein n is an integer greater than or equal to 2.

3. The liquid crystal display panel according to claim 2, wherein the control terminal of the first main thin film transistor on the nth row of the pixels is connected to the second branch of the scanning line to which the nth row of the pixels correspond; the control terminal of the first auxiliary thin film transistor of the pixel adjacent to the pixel on the nth row is connected to the first branch of the scanning line to which the nth row of the pixels correspond;

the control terminal of the second main thin film transistor on the nth row of the pixels is connected to the first branch of the scanning line to which the (n+1)th row of the pixels correspond; the control terminal of the second auxiliary thin film transistor of the pixel adjacent to the pixel on the nth row is connected to the second branch of the scanning line to which the (n−1)th row of pixels correspond; and the control terminal of the first auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

4. The liquid crystal display panel according to claim 2, wherein the main pixel is further disposed with a third capacitor; the sub-pixel is further disposed with a fourth capacitor;

the output terminal of the second main thin film transistor is connected to the third capacitor;

the output terminal of the second auxiliary thin film transistor is connected to the fourth capacitor.

5. The liquid crystal display panel according to claim 2, wherein the liquid crystal display panel comprises a common electrode, the output terminal of the second main thin film transistor is connected to the common electrode, the output terminal of the second auxiliary thin film transistor is also connected to the common electrode.

6. The liquid crystal display panel according to claim 2, wherein when the liquid crystal display panel scans from top to bottom, a display brightness of the main pixel is less than the display brightness of the sub-pixel; when the liquid crystal display panel scans from bottom to top, the display brightness of the main pixel is greater than or equal to the display brightness of the sub-pixel.

7. The liquid crystal display panel according to claim 2, wherein the control terminal of the first main thin film transistor on the nth row of the pixels is connected to the first branch of the scanning line to which the nth row of the pixels correspond; the control terminal of the first auxiliary thin film transistor of the pixel adjacent to the pixel on the nth row is connected to the second branch of the scanning line to which the nth row of the pixels correspond;

the control terminal of the second main thin film transistor on the nth row of the pixels is connected to the first branch of the scanning line to which the (n+1)th row of the pixels correspond; the control terminal of the second auxiliary thin film transistor of the pixel adjacent to the pixel on the nth row is connected to the second branch of the scanning line to which the (n−1)th row of pixels correspond; and the control terminal of the first auxiliary thin film transistor on the (n+1)th row of pixels is connected to the second branch of the scanning line to which the (n+1)th row of pixels correspond; the control terminal of the first main thin film transistor of the pixel adjacent to the pixel on the (n+1)th row is connected to the first branch of the scanning line to which the (n+1)th row of pixels correspond.

8. The liquid crystal display panel according to claim 2, wherein the sub-pixel is correspondingly disposed with a first auxiliary thin film transistor and a second auxiliary thin film transistor;

the input terminal of the first auxiliary thin film transistor is connected to the data line, the output terminal of the first auxiliary thin film transistor is connected to the second capacitor; a second control terminal of the auxiliary thin film transistor on the (n+1)th row of pixels is connected to a second branch of the scanning line to which the nth row of the pixels correspond.

9. The liquid crystal display panel according to claim 8, wherein the control terminal of the first main thin film transistor on the nth row of the pixels is connected to the first branch of the scanning line to which the nth row of the pixels correspond; the control terminal of the first auxiliary thin film transistor of the pixel adjacent to the pixel on the nth row is connected to the second branch of the scanning line to which the nth row of the pixels correspond;

the control terminal of the second main thin film transistor on the nth row of the pixels is connected to the first branch of the scanning line to which the (n+1)th row of the pixels correspond; the second control terminal of the auxiliary thin film transistor of the pixel adjacent to the pixel on the nth row is connected to the second branch of the scanning line to which the (n−1)th row of pixels correspond; and the control terminal of the first auxiliary thin film transistor on the (n+1)th row of pixels is connected to the second branch of the scanning line to which the (n+1)th row of pixels correspond; the control terminal of the first main thin film transistor of the pixel adjacent to the pixel on the (n+1)th row is connected to the first branch of the scanning line to which the (n+1)th row of pixels correspond.

10. The liquid crystal display panel according to claim 8, wherein the control terminal of the first main thin film transistor on the nth row of the pixels is connected to the second branch of the scanning line to which the nth row of the pixels correspond; the control terminal of the first auxiliary thin film transistor of the pixel adjacent to the pixel on the nth row is connected to the first branch of the scanning line to which the nth row of the pixels correspond;

the control terminal of the second main thin film transistor on the nth row of the pixels is connected to the first branch of the scanning line to which the (n+1)th row of the pixels correspond; the control terminal of the second auxiliary thin film transistor of the pixel adjacent to the pixel on the nth row is connected to the second branch of the scanning line to which the (n−1)th row of pixels correspond; and the control terminal of the first auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

11. The liquid crystal display panel according to claim 8, wherein the main pixel is further disposed with a third capacitor; the sub-pixel is further disposed with a fourth capacitor;

the output terminal of the second main thin film transistor is connected to the third capacitor;

the output terminal of the second auxiliary thin film transistor is connected to the fourth capacitor.

12. The liquid crystal display panel according to claim 8, wherein the liquid crystal display panel comprises a common electrode, the output terminal of the second main thin film transistor is connected to the common electrode, the output terminal of the second auxiliary thin film transistor is also connected to the common electrode.

13. The liquid crystal display panel according to claim 2, wherein the sub-pixel is correspondingly disposed with only one auxiliary thin film transistor;
- the control terminal of the first main thin film transistor on the nth row of the pixels is connected to the second branch of the scanning line to which the nth row of the pixels correspond; the control terminal of the auxiliary thin film transistor of the pixel adjacent to the pixel on the nth row is connected to the first branch of the scanning line to which the nth row of the pixels correspond;
- the control terminal of the second main thin film transistor on the nth row of the pixels is connected to the first branch of the scanning line to which the (n+1)th row of the pixels correspond; and
- the control terminal of auxiliary thin film transistor on the (n+1)th row of pixels is connected to the first branch of the scanning line to which the (n+1)th row of pixels correspond; the control terminal of the first main thin film transistor of the pixel adjacent to the pixel on the (n+1)th row is connected to the second branch of the scanning line to which the (n+1)th row of pixels correspond.

14. The liquid crystal display panel according to claim 13, wherein the liquid crystal display panel comprises a common electrode, the main pixel is further disposed with a third capacitor;
- the output terminal of the second main thin film transistor is connected to the third capacitor or the common electrode.

15. The liquid crystal display panel according to claim 2, wherein the first branch and the second branch respectively correspond to a position at a junction of the two adjacent pixels.

16. The liquid crystal display panel according to claim 2, wherein when the liquid crystal display panel scans from top to bottom, a display brightness of the main pixel is less than the display brightness of the sub-pixel;
- when the liquid crystal display panel scan from bottom to top, the display brightness of the main pixel is greater than or equal to the display brightness of the sub-pixel.

* * * * *